US005112423A

United States Patent [19]

Liebe, Jr.

[11] Patent Number: 5,112,423

[45] Date of Patent: May 12, 1992

[54] METHOD OF MAKING AND APPLYING ALIGNMENT-MAINTAINING PLASTIC LETTERING MATERIAL

[76] Inventor: Robert J. Liebe, Jr., 1577 Kehrs Mill Rd., Chesterfield, Mo. 63005

[21] Appl. No.: 636,877

[22] Filed: Jan. 2, 1991

[51] Int. Cl.[5] ........................ B44C 1/17; B44C 1/165; B32B 31/18

[52] U.S. Cl. .................................... 156/234; 156/247; 156/257; 156/264; 156/267; 428/41; 428/914

[58] Field of Search ........ 156/230, 234, 264, 267–268, 156/257, 247; 525/239, 331.5; 428/914, 40, 41, 346, 354

[56] References Cited

U.S. PATENT DOCUMENTS

| | | | |
|---|---|---|---|
| 3,453,761 | 7/1969 | Giesecke | 156/28 S X |
| 3,616,026 | 10/1971 | Larsen | 156/230 X |
| 3,660,212 | 5/1972 | Liebe, Jr. | 428/41 |
| 3,676,248 | 7/1972 | Swartz | 156/230 X |
| 5,026,584 | 6/1991 | Logan | 156/234 X |

*Primary Examiner*—Michael W. Ball
*Assistant Examiner*—Adrienne C. Johnstone
*Attorney, Agent, or Firm*—Jerome A. Gross

[57] ABSTRACT

Plastic lettering material having a polyvinyl chloride display layer fused with greater adherence onto a release sheet. Including partially carboxylated polyvinyl chloride in the display layer provides substantially increased adhesion, as does a heat-stabilized polyester release sheet. A layer of non-encapsulating thermoplastic adhesive capable of substantially permanent adherence to a smooth substrate is adhered to the display layer surface opposite the release sheet. Outlines of individual lettering elements which together form a sign content are cut through the adhesive and display layers while the release sheet remains substantially uncut, and that portion of the display and adhesive layers not included in the outlines is stripped away. This leaves the lettering elements firmly adhered to the release sheet, maintaining them in alignment during positioning on and heat bonding to a permanent substrate.

3 Claims, 2 Drawing Sheets

METHOD OF MAKING AND APPLYING ALIGNMENT-MAINTAINING PLASTIC LETTERING MATERIAL

BACKGROUND OF THE INVENTION

1. Field of the Invention

This invention relates to lettering elements, including figures and designs, cut from pigmented flexible plastic sheet material; and to the process of applying them in an aligned group, as on commercial awnings and other impervious surfaces.

2. Description of Related Art

U.S. Pat. No. 3,660,212 to Liebe discloses a process for making plastic lettering material comprising a paper release sheet, a vinyl display layer, and an encapsulating thermoplastic adhesive sheet bonded to the surface of the display layer opposite the release sheet. For application of a design or lettering onto a woven or knitted garment or other permanent substrate, separate lettering elements are die-stamped from such sheet material and individually positioned and heat bonded (in effect ironed) onto the surface of the substrate, the heat liquefied adhesive creating a mechanical bond by flowing into and curing within the interstitial spaces of the porous surface of the substrate.

The minimal adhesion of the vinyl display layer to the release sheet may allow the edges of individual lettering elements to detach and curl away from the release sheet. Since both the display layer and release sheet are cut through at their edges, such curling is readily detectable and correctable during application of an individual lettering element, and has not been a serious deterrent to the use of the lettering material.

No prior art known to Applicant discloses lettering material whose display layer adheres to a release sheet with sufficient tenacity to permit the release sheet to remain intact and serve as a carrier for an assemblage of individual lettering elements cut, from an adhesive side, through the adhesive and display layers to be together mounted on a substrate.

For a somewhat similar purpose, U.S. Pat. No. 4,786,349 to Mahn discloses the concept of a continuous layer of adhesive cast onto a release sheet, onto which indicia have been roll printed, using thermosetting ink. For application of these indicia to a permanent substrate, the release sheet is to be removed, the unprinted surface of the adhesive positioned onto the surface of the substrate, blotting paper placed over the printed surface of the adhesive, and heat and pressure sufficient to liquefy the adhesive applied. That portion of the liquefied adhesive not beneath indicia is to be absorbed by the blotting paper, and removed from the substrate. It is not known by Applicant if this method proved to be practical.

SUMMARY OF THE INVENTION

The present invention provides a layered, alignment-maintaining plastic lettering material whose release sheet is maintained intact when the discrete lettering elements of an entire sign content are spacedly plotted and cut into the vinyl display layer and adhesive layer of the material, in the exact pattern in which they are subsequently to be mounted on a substrate. The present invention provides tenacious adhesion between the cut lettering elements of the vinyl display layer and the uncut release sheet, thereby eliminating the necessity of positioning individually for mounting each lettering element of a total sign content. Such adhesion substantially prevents curling of the edges of the lettering elements, this being mandatory when the intact release sheet covers the cut edges of an assemblage of lettering elements.

The pigmented vinyl display layer of the present invention may contain two vinyl chloride polymers, one of which has been partially carboxylated. I have found that including partially carboxylated polyvinyl chloride forms a display layer which adheres with greatly increased tenacity to the release sheet onto which it is cast and cured, yet allows the release sheet to be stripped away from the mounted lettering elements as hereinafter described.

The display layer is stabilized against ultra violet radiation and highly pigmented, rendering it nearly impervious to exposure to sunlight and well adapted, therefore, to outdoor use.

The preferred adhesive layer of the present invention is of polyester or polyurethane adhesive capable of permanently affixing lettering elements to a substantially smooth substrate, such as signs and awnings. Use of such non-encapsulating adhesive contrasts to the prior patent to Liebe, which uses an encapsulating adhesive for lettering material intended for application on woven or knitted fabrics.

The release sheet of the present invention may be of translucent heat stabilized polyester, which allows for visual inspection of the alignment and placement of the sign content, as well as the edges of the individual lettering elements which comprise the sign content.

The alignment-maintaining plastic lettering material of the present invention advantageously uses commercially available, computerized plotter cutters capable of plotting the layout of a sign content composed of discrete lettering elements, and cutting it into the lettering material to a precise depth. Outlines of such individual lettering elements are cut, by use of such equipment, through the adhesive and display layers of the lettering material, to, but not through, the release sheet. Portions of the display and adhesive layers not within the outlines of such cut lettering elements are then stripped away; the lettering elements which form the sign content remain firmly adhered to the release sheet, and may as a unit be positioned for mounting on the surface of a permanent substrate.

For final application to a permanent substrate, heat and pressure, applied to the surface of the portions of the release sheet overlaying such lettering elements, penetrate through the display layer to melt the adhesive layer therebeneath, bonding the individual lettering elements of the sign content to the permanent substrate.

The lettering material of the present invention is uniquely advantageous for lettering outdoor signs of large proportion. The increased adhesion of the display layer to the release sheet allows lettering elements to be maintained during application as they were plotted and cut; the ultra-violet stabilized display layer is not substantially affected by exposure to sunlight; and the non-encapsulating polyester adhesive bonds to the smooth, slick surfaces conventionally used for awnings and signs.

DESCRIPTION OF THE PREFERRED EMBODIMENT

Figure 1:
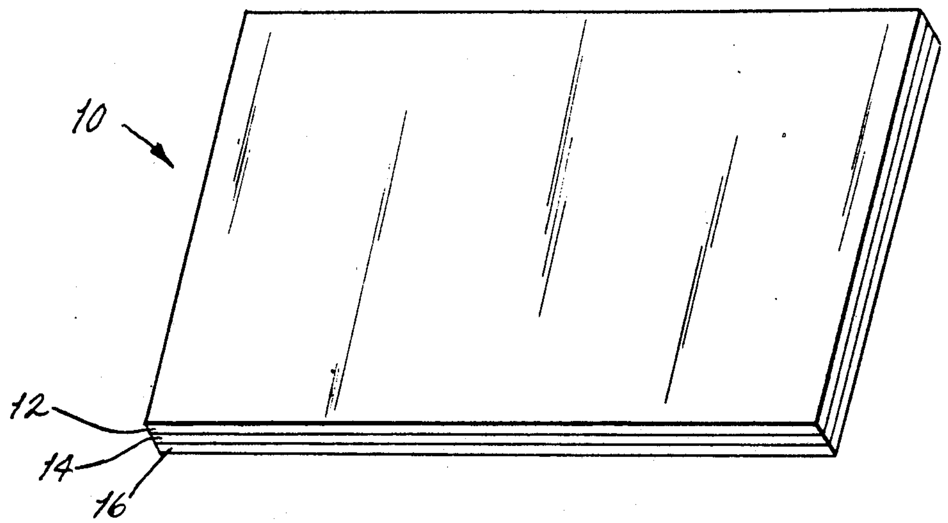
FIG. 1 illustrates, in exaggerated thickness, a portion of a sheet of the layered material of the present invention.

The alignment-maintaining plastic lettering material 10 of the present invention, shown in exaggerated thickness in FIG. 1, includes three layers: (1) a pigmented display layer 14 including a mixture of polyvinyl chloride, partially carboxylated polyvinyl chloride, pigments, and stabilizers; cast onto (2) a translucent release sheet of heat stabilized polyester 16 adhered to its opposite surface; and (3) a non-encapsulating polyester adhesive layer adhered to its opposite surface. The material 10 of the present invention may be laid up by the use of the equipment and process described in U.S. Pat. No. 3,660,212 to Liebe.

The display layer 14 of the present invention may be formed from: a physical mixture, in a plasticizer dispersion, of equal parts of two polyvinyl chloride polymers in powder form, one of which has been partially carboxylated; pigment, including varying amounts of colorant; and epoxy and tin maleate stabilizers. The partially carboxylated polyvinyl chloride may contain a carboxylic acid functionality of 1.67%. The non-carboxylated polyvinyl chloride may contain 95.5% polyvinyl chloride and 4.5% vinyl acetate. The preferred formula for the display layer 14 is as follows:

| | % by weight |
|---|---|
| Partially Carboxylated PVC | 22.5 |
| Copolymer PVC | 22.5 |
| Phthalate Ester Plasticizer | 35.0 |
| Titanium Dioxide Pigment and Colorant | 18.0 |
| Epoxy Stabilizer | 0.5 |
| Tin Maleate Stabilizer | 1.5 |

Satisfactory results may be obtained with the total 45% of PVC blend comprised of between 15 to 30% partially carboxylated PVC with a remainder non-carboxylated PVC.

The curing temperature of this display layer 14 may be substantially 450° F., between the melting point of the release sheet (509° F.) and the fusing point of the adhesive layer (320° F.), as hereafter described.

The display layer 14 may be stabilized against ultraviolet radiation by use of a combination of conventional organometallic stabilizers as above set forth, epoxy stabilizers and high pigment loading, so that ultraviolet light is adequately screened from degrading the polymer.

The release sheet 16, which remains substantially intact when individual lettering elements are cut, and serves as a carrier for such elements as hereinafter described, is preferably a translucent heat-stabilized polyester film available under the trade name Melinex ST 507 from ICI Americas, Inc., of Wilmington, Del. The melting point of such sheet should be greater than 500° F., to withstand the temperature required for curing the display layer 14 on it. To provide sufficient thickness and strength for ease in handling and for the cutting process hereinafter described, the sheet 16 may have a tensile strength of 24,000 psi. and be from 300 to 500 gauge thickness. The greater thickness allows for variation in the ability of individual plotter/cutters to cut to a precise depth, thus avoiding accidental severing of the release sheet 16.

For the adhesive layer 12, I use a non-encapsulating adhesive, preferably polyester, capable of substantially permanent adhesion to a substantially smooth substrate. The fusing temperature of such adhesive may be substantially less than 320° F. Bostik 4103 Hot Melt Adhesive, Bostik 4117 Polyester Extrusion Polymer, and B.F. Goodrich Estane 58409 are commercially available adhesives which meet these requirements. I form and apply this layer as described in my prior patent, U.S. Pat. No. 3,660,212.

To form the material 10 of the present invention, said polyvinyl chloride mixture used to form the display layer 14 is knife spread to a thickness of say 5 mils, onto said release sheet 16 and cured at a temperature which may be approximately 450° F., as described in said U.S. Pat. No. 3,660,212. Such curing causes the discrete particles of polyvinyl chloride and carboxylated polyvinyl chloride to go irreversibly into solution, forming a display layer 14. The presence of such partially carboxylated polyvinyl chloride in this layer 14 affords enhanced adherence to the release sheet 16, which is particularly useful if the release sheet 16 has been coated with a silicon release agent or is a paper release sheet as hereinafter referred to. The higher melting pointing of the release sheet 16 than that of the display layer 14 allows such curing without softening or distortion of the release sheet 16.

A pre-formed sheet of thermoplastic polyester adhesive 12 is adhered to the heated surface of the newly-cured display layer 14 while its temperature is higher than the fusing point of said adhesive layer 12, in the manner described in said U.S. Pat. No. 3,660,212 to Liebe, and the material 10 so formed is allowed to cool to room temperature.

Figure 2:
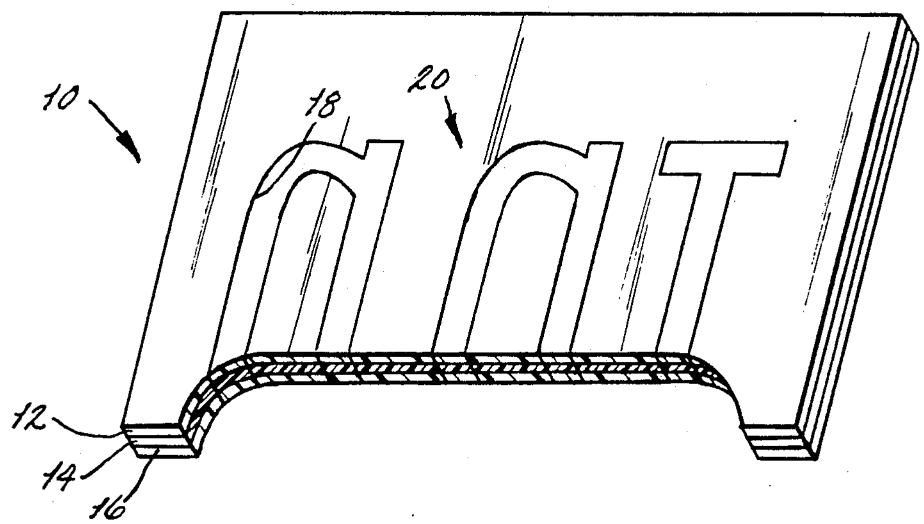
FIG. 2 shows, in broken cross-section, the material of FIG. 1, after the outlines of separate lettering elements have been cut through the display and adhesive layers.
Figure 3:
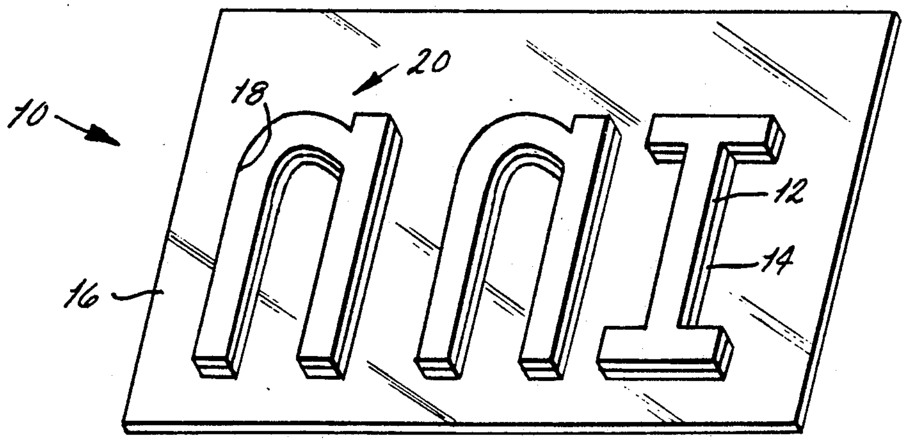
FIG. 3 illustrates such separate lettering elements of FIG. 2, the display and adhesive material not within their outlines having been removed, thus prepared for application to a permanent substrate and maintained in desired alignment by their adherence to the release sheet.

All lettering elements 20—that is, letters, numbers, and design graphics—which, in composite, form the sign content to be applied on, for example, a commercial awning, are comprised of the laid up material 10 so formed. Such lettering elements 20 may be discrete, partially connected, or connected, as in script form. Their outlines 18 are cut preferably by a conventional computerized plotter/cutter such as the Gerber HS750 High Speed Plotter/Cutter through the adhesive and display layers 12, 14 of the material 10, to, but not substantially through, the release sheet 16, as shown in broken cross-section in FIG. 2. That portion of the adhesive and display layers 12, 14 not within such outlines 18 is stripped away from the release sheet 16, leaving the lettering elements 20 of the sign content, as illustrated in FIG. 3, adhered to the release sheet 16 in the pattern, spacing, and alignment in which they were plotted and cut. The high degree of adhesion achieved by the present invention prevents the edges of said lettering elements 20 from curling or detaching from the release sheet 16 during subsequent handling.

Figure 4:
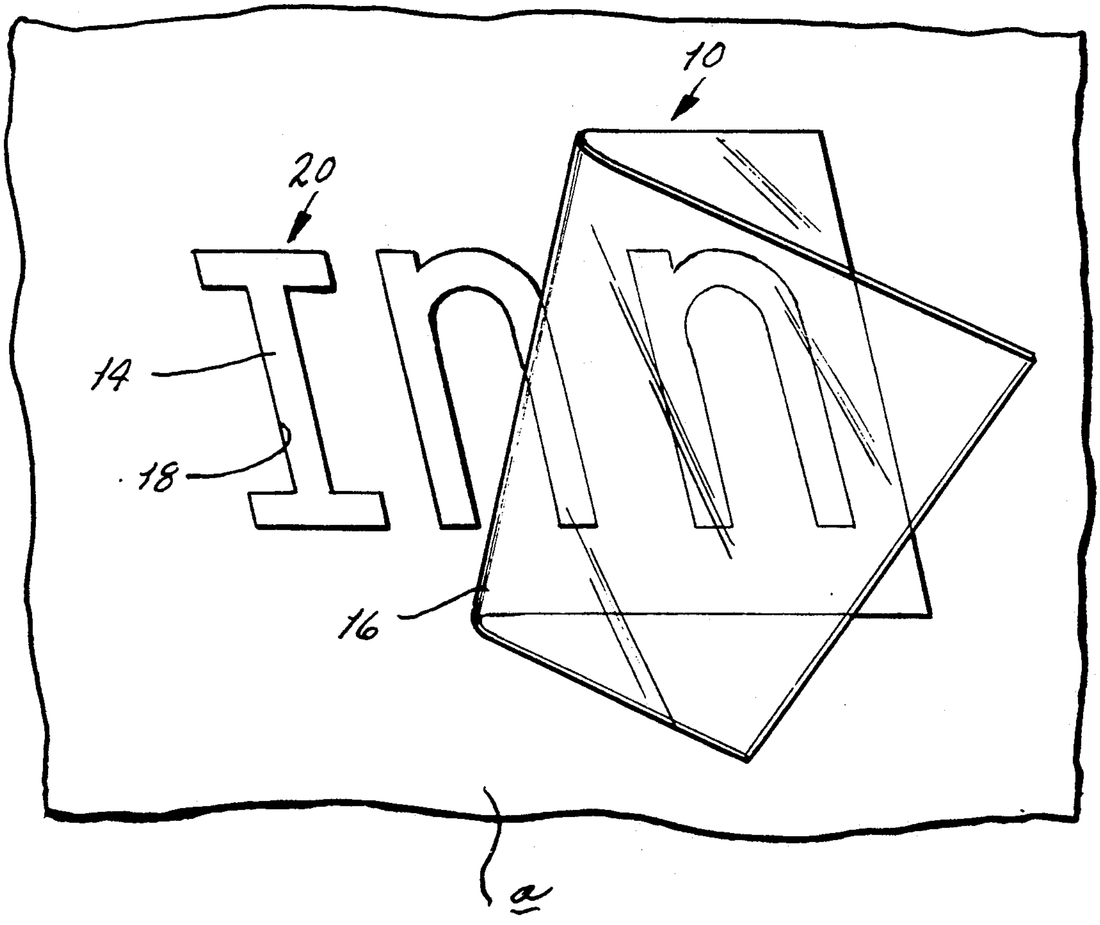
FIG. 4 illustrates such lettering elements applied to a substrate, with the release sheet being partially stripped away.

Thereafter, for application to a permanent substrate a, the sign content, composed of the individual lettering elements 20 adhered to the release sheet 16, is positioned with its adhesive layer 12 against the surface of the substrate a. The sign content is visually checked through the translucent release sheet 16 to ascertain that it is in the desired position on the substrate a, and that edges of the lettering elements 20 remain flat. Heat and pressure are then applied to the release sheet 16 where it overlays lettering elements 20. Heat penetration through the release sheet 16 and the display layer 14 raises the temperature of the adhesive layer 12 sufficiently to soften and fuse it permanently to the smooth surface of the substrate a. Temperatures sufficiently high as to soften and distort the polyvinyl chloride display layer 12 and the polyester release sheet 16 should be avoided. Thereafter, when the display layer 14 has cooled to room temperature, the release sheet 16 may be stripped away from the sign content as shown in FIG. 4.

The sign content applied using the process of the present invention presents an attractive appearance: the precise computer-plotted spacing and alignment of each lettering element 20 in the sign content is maintained through handling and mounting, and the edges of the individual lettering elements 20 are sharp and undistorted by curling.

Including carboxylated polyvinyl chloride in the display layer 12 provides maximum adhesion to the heat stabilized polyester release sheet 16. An industry standard, "grams of release rating," measures the weight per square inch required to detach a one inch strip of tape from a release sheet. Informal tests indicate the highest grams of release rating consistent with adequate stripping away of the release sheet 16 is achieved by this embodiment.

MODIFIED EMBODIMENTS

While the embodiment described above is preferred for the advantage of translucency of the release sheet along with a relatively high degree of adhesion of the polyvinyl chloride display layer to it, modifications within the scope of the invention may be made as follows.

In some applications, a lesser adhesion may be preferred or considered satisfactory, depending upon such factors as the size of the sign content to be applied as a unit, the dimensions (e.g. slenderness) of the individual lettering elements, the chosen thickness of the vinyl display layer, and the amount of handling to which the material may be subjected following cutting of the sign content. Adhesion may be reduced in several ways (hereinafter described in approximate descending order of adhesion). All of the polyvinyl chloride used in the display layer may be non-carboxylated, or if partially carboxylated polyvinyl chloride is used, a heat stabilized polyester release sheet may be coated with a conventional release agent, such as silicon.

For even less adhesion, all of the polyvinyl chloride used may be non-carboxylated, and the heat stabilized polyester release sheet may be coated with a conventional release agent such as silicon.

Finally, where the advantage of release sheet translucency may be dispensed with, a paper release sheet may be used with a display layer containing partially carboxylated polyvinyl chloride. A medium grade of release paper, having a "grams of release" rating of 25, is appropriate for use with such display layer.

To provide sufficient thickness for handling, release paper having a basis weight of at least 80 may be used. Release paper having a basis weight of as much as 110 may be preferred, however, to allow for variation in the ability of individual plotter/cutters to cut to a precise depth, thus to provide sufficient thickness for prevention of accidental severing of the release sheet.

While the present invention has been described for its use on signs and awnings, it may be advantageously used on the pervious fabrics of knitted or woven garments and the like, in which case an encapsulating adhesive, conventionally used to apply lettering to garments, may be substituted for the nonencapsulating polyester adhesive layer 12. Further, while the adhesive has been herein described as being a polyester layer adhered in sheet form onto the display layer, the adhesive may alternatively be applied in any form found suitable Cutting, herein described as done by a plotter/cutter, may be done by other conventional methods, such as hand-cutting on a hard surface.

Throughout this application the term "translucent" is to be taken to include "transparent." The term "cast onto" is to be taken to include the term "fused onto."

As various modifications may be made in the constructions herein described and illustrated without departing from the scope of the invention, it is intended that all matter contained in the foregoing description or shown in the accompanying drawings shall be interpreted as illustrative rather than limiting.

I claim:

1. For lettering a substrate, making and using polyvinyl chloride sheet lettering material having a release sheet and adhesive layer comprising the steps of compounding a display layer by intermixing polyvinyl chloride, partially carboxylated polyvinyl chloride, and pigments, applying and heat curing said display layer onto a release sheet, whereby to form a vinyl display layer wherein said partially carboxylated polyvinyl chloride affords enhanced adhesion to said release sheet, and applying a layer of non-encapsulating thermoplastic adhesive having a lower melting point than said display layer onto the surface of said display layer while the temperature of said display layer is higher than the fusing point of said adhesive layer, allowing said lettering material to cool to room temperature, and thereafter cutting outlines of a plurality of adjacent substantially separate lettering elements through said adhesive and display layers, but not through said release sheet, removing from said release sheet those portions of said display layer and said adhesive layer not included within said outlines, positioning said substantially separate lettering elements, so aligned by their continued adherence to said release sheet, onto such substrate with their adhesive layer in contact with such substrate, applying, against the portions of said release sheet overlaying said lettering elements so positioned, heat and pressure sufficient to soften said adhesive layer and fuse said elements to such substrate, and removing said release sheet.

2. The process as defined in claim 1, wherein said release sheet is translucent heat-stabilized polyester having a higher fusing point than said display layer, and further including, subsequent to positioning and prior to application, the step of visually checking through said translucent release sheet the position of said lettering elements relative to such permanent substrate.

3. The process as defined in claim 1, wherein said display layer includes stabilizers against ultraviolet radiation.

* * * * *